US009873048B2

(12) United States Patent
Yoshioka

(10) Patent No.: US 9,873,048 B2
(45) Date of Patent: Jan. 23, 2018

(54) METHOD AND SYSTEM FOR ADJUSTING A FIELD OF VIEW REGION IN A VIRTUAL SPACE

(71) Applicant: COLOPL, Inc., Tokyo (JP)

(72) Inventor: Takanori Yoshioka, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/430,436

(22) Filed: Feb. 10, 2017

(65) Prior Publication Data
US 2017/0232343 A1 Aug. 17, 2017

(30) Foreign Application Priority Data

Feb. 12, 2016 (JP) .................................. 2016-024810

(51) Int. Cl.
G09G 5/00 (2006.01)
A63F 13/525 (2014.01)
G06T 19/00 (2011.01)
H04N 7/18 (2006.01)
G06F 3/0481 (2013.01)
(Continued)

(52) U.S. Cl.
CPC .......... *A63F 13/525* (2014.09); *G06T 19/006* (2013.01); *H04N 7/185* (2013.01); *A63F 2300/8082* (2013.01); *G06F 3/011* (2013.01); *G06F 3/017* (2013.01); *G06F 3/0485* (2013.01); *G06F 3/04815* (2013.01); *G06K 9/00355* (2013.01); *G06T 19/00* (2013.01); *G06T 2207/30196* (2013.01)

(58) Field of Classification Search
CPC ......... G02B 27/01; G06F 3/011; G06F 3/017; G06F 3/04815; G06F 3/0485; G06K 9/00355; G06T 19/00; G06T 19/006; G06T 2207/30196

USPC ...................................................... 345/8, 633
See application file for complete search history.

(56) References Cited

U.S. PATENT DOCUMENTS

2016/0313790 A1* 10/2016 Clement ................. G06F 3/011
2017/0068323 A1* 3/2017 West ....................... G06F 3/017

FOREIGN PATENT DOCUMENTS

| JP | 2012-104021 A | 5/2012 |
|---|---|---|
| JP | 5767386 B1 | 8/2015 |
| JP | 2015-221068 A | 12/2015 |

OTHER PUBLICATIONS

Office Action in JP Application No. 2016-024810, dated Aug. 9, 2016.
(Continued)

*Primary Examiner* — Jin-Cheng Wang
(74) *Attorney, Agent, or Firm* — Hauptman Ham, LLP

(57) ABSTRACT

A method of adjusting a field of view of a user for a head mounted display (HMD) includes defining a virtual camera for specifying an image of the field of view in a virtual space. In response to updating an image of the field of view by changing a position of the virtual camera without synchronization with the movement of the HMD, the position of the virtual camera is moved in a movement direction of a player object to move the player object into a predetermined range of the field of view. The field of view is sectioned into a non-tracking region defined by the predetermined range, a near tracking region, and a far tracking region. A relief region is between the non-tracking region and the far tracking region. Movement of the player object is based on a location of the player object within the field-of view region.

10 Claims, 11 Drawing Sheets

(51) Int. Cl.
G06F 3/01 (2006.01)
G06K 9/00 (2006.01)
G06F 3/0485 (2013.01)

(56) References Cited

OTHER PUBLICATIONS

Decision to Grant a Patent in JP Application No. 2016-024810, dated Dec. 20, 2016.
VR-Dings |49, 5| Shironeko VR Project + Colopad + DK 2, [online], YouTube, Jan. 11, 2015, [Aug. 1, 2016 search], Internet<URL:https://www.youtube.com/watch?v=VQR_dsEZZ-M>.
"Example of measure against VR drunkenness", [online], GREE Engineer's Blog, Dec. 5, 2015, [Aug. 1, 2016 search], Internet<URL:http://labs.gree.jp/blog/2015/12/14618/>.
"Pleasure" is indispensable to VR games. "Presence" exists ahead of the pleasure, VR Gaming Today of Sato Kafuji!, [online], GAME Watch, Sep. 8, 2015, [Aug. 2, 2016 search] Internet<URL:http://game.watch.impress.co.jp/docs/series/vrgaming / 720016.html>.
"[CEDEC 2015] What should be 'avoided' in VR? Oculus VR teaches a technique for comfort VR content production," [online], Aug. 22, 2015, 4Gamer.net, [search on Jan. 13, 2016], Internet <URL: http://www.4gamer.net/games/195/G019528/20150828092/>.

* cited by examiner

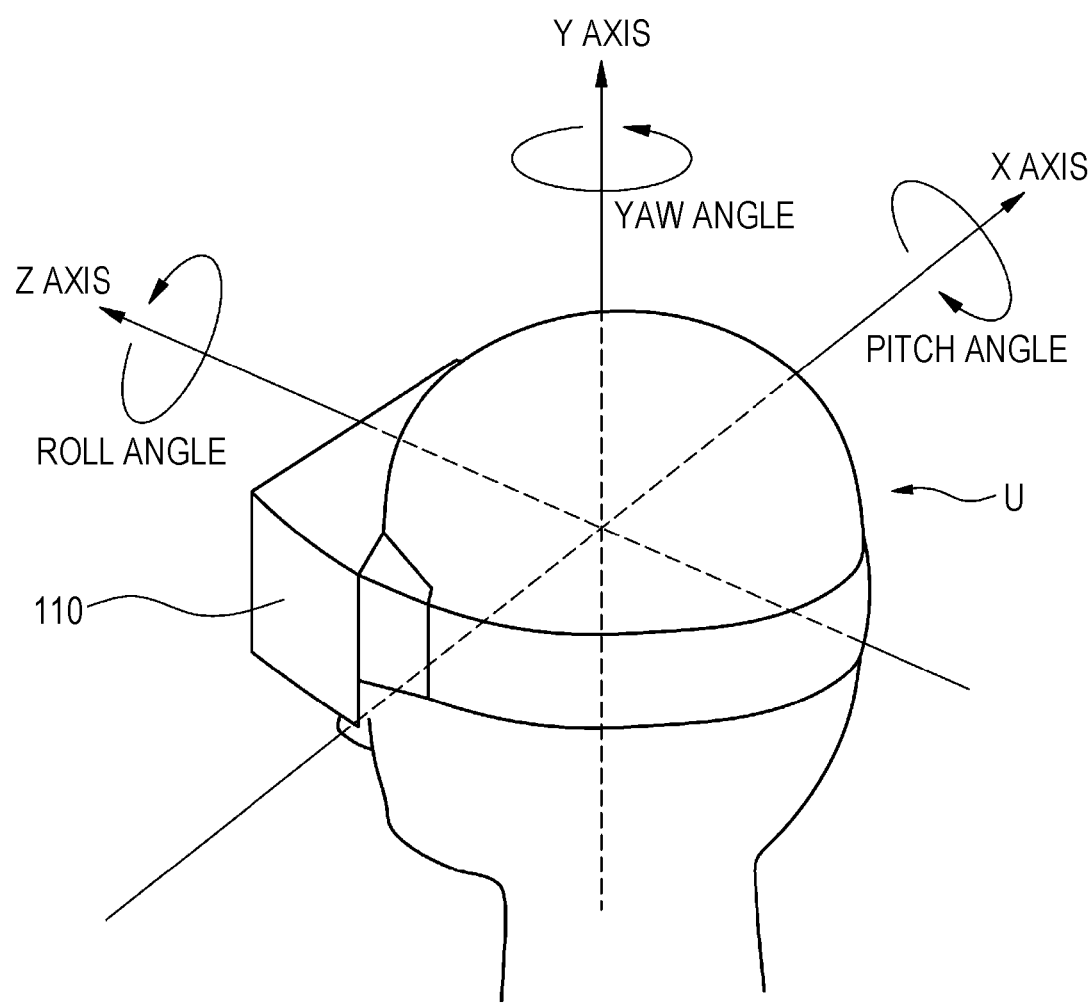

METHOD AND SYSTEM FOR ADJUSTING A FIELD OF VIEW REGION IN A VIRTUAL SPACE

RELATED APPLICATIONS

The present application claims priority to Japanese Patent Application No. 2016-024810 filed Feb. 12, 2016, the disclosure of which is hereby incorporated by reference herein in its entirety.

BACKGROUND

This disclosure relates to a method and system for providing, to a head mounted display, a virtual space in which a user is immersed.

In Japanese Patent No. 5,767,386, a head mounted display system is described. While an application is running, the head mounted display system performs processing of changing display of an image in a virtual space, which is displayed in a user's visual field in synchronization with a movement of a head of a user wearing a head mounted display (hereinafter also referred to as "HMD"). Meanwhile, the display of the image in the virtual space can be changed with use of a controller that is connected to the HMD so as to be capable of communicating to/from the HMD.

In the head mounted display system as described in Japanese Patent No. 5,767,386, for example, in a case of a sports game, a position of a virtual camera that defines a image of the field of view is fixed even though a player moves around freely in the virtual space. Meanwhile, when the image of the field of view is updated by moving the position and the direction of the virtual camera with use of the controller without synchronization with the movement of the HMD, the user experiences a visual effect that does not synchronize with the movement of the HMD. In particular, as described in "[CEDEC 2015] What should be 'avoided' in VR? Oculus VR teaches a technique for comfort VR content production," [online], Aug. 22, 2015, 4Gamer.net, [search on Jan. 13, 2016], Internet <URL: http://www.4gamer.net/games/195/G019528/20150828092/>, when the virtual camera is moved backward, moved at high speed, or moved in a curved motion, the user is more susceptible to the VR sickness.

SUMMARY

This disclosure helps to provide a method and system for adjusting a field of view region in a virtual space, which are capable of obtaining an improved sense of presence and reducing a visually induced motion sickness.

According to at least one embodiment of this disclosure, there is provided a method of adjusting a field of view region of a user in a virtual space provided to a head mounted display of a non-transmissive type (or partially transmissive type). The method includes defining a virtual camera for specifying an image of the field of view that is visually recognizable by the user in a virtual space image forming the virtual space. The method further includes displaying the image of the field of view on the head mounted display. The method further includes moving a player object arranged in the virtual space based on a user action. The method further includes updating the image of the field of view by changing a direction of the virtual camera in synchronization with a movement of the head mounted display. The method further includes moving, when the image of the field of view is updated by changing a position of the virtual camera without synchronization with the movement of the head mounted display, the position of the virtual camera in a movement direction of the player object such that the player object moved in the field of view region is located within a predetermined range of the field of view region.

Further, according to at least one embodiment of this disclosure, there is provided a system for executing the method of adjusting a field of view region of a user in a virtual space described above.

According to this disclosure, there are provided the method and system for adjusting a field of view region in a virtual space, which help to obtain an improved sense of presence and reduce a visually induced motion sickness.

BRIEF DESCRIPTION OF THE DRAWINGS

FIG. 3 is a diagram of an orthogonal coordinate system on a three-dimensional space defined about a head of a user wearing an HMD.

DETAILED DESCRIPTION

Figure 1:
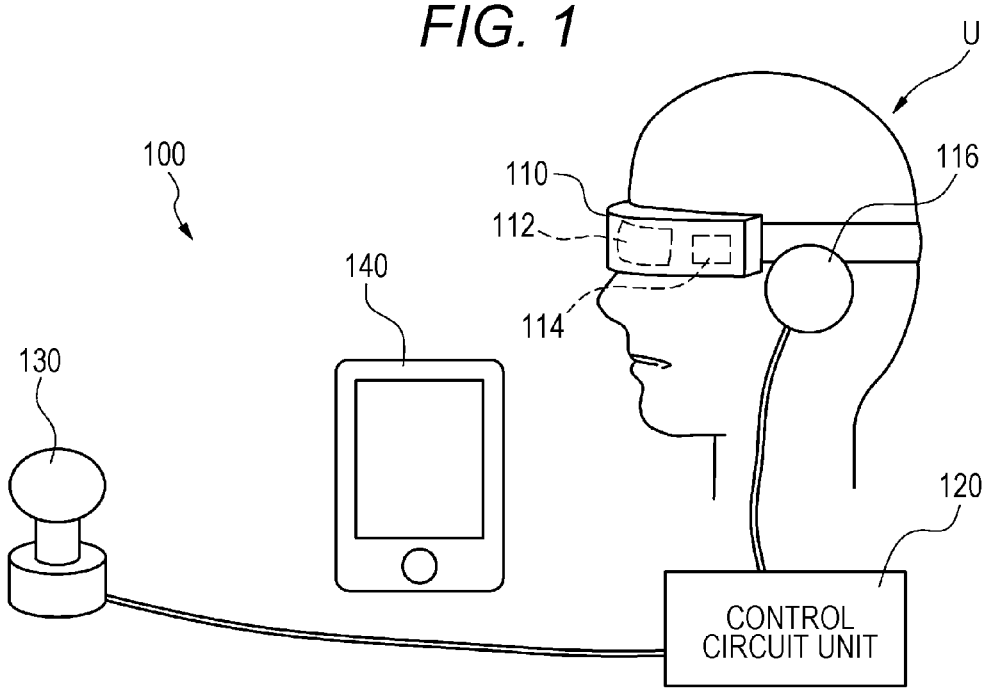
FIG. 1 is a schematic view of a configuration of an HMD system according to at least one embodiment of this disclosure.

First, contents of at least one embodiment of this disclosure are described in a list. A method and system for adjusting a field of view region in a virtual space according to at least one embodiment of this disclosure have the following configurations.

(Item 1)

A method of adjusting a field of view region according to at least one embodiment of this disclosure is a method of adjusting a field of view region of a user in a virtual space provided to a head mounted display of a non-transmissive type. The method includes defining a virtual camera for specifying an image of the field of view that is visually recognizable by the user in a virtual space image forming the virtual space. The method further includes displaying the image of the field of view on the head mounted display. The method further includes moving a player object arranged in the virtual space based on a user action. The method further includes updating the image of the field of view by changing a direction of the virtual camera in synchronization with a movement of the head mounted display. The method further includes moving, when the image of the field of view is updated by changing a position of the virtual camera without synchronization with the movement of the head mounted display, the position of the virtual camera in a movement direction of the player object such that the player object moved in the field of view region is located within a predetermined range of the field of view region.

With this configuration, the image of the field of view is updated by changing the position of the virtual camera in accordance with the movement of the player object, and hence the user's sense of presence is improved, at least in some instances. Further, the direction of the virtual camera is changed in synchronization with the movement of the head mounted display, and the change of the direction is predictable by the user. Therefore, a VR sickness of the user is reduced, at least in some instances.

(Item 2)

In at least one embodiment, the position of the virtual camera be moved at a speed lower than a movement speed of the player object.

By moving the position of the virtual camera at a speed slower than the player object, the VR sickness is suppressed.

(Item 3)

In at least one embodiment, the field of view region be sectioned into a non-tracking region being the predetermined range, a near tracking region on a near side of the virtual camera with respect to the non-tracking region, and a far tracking region on a far side of the virtual camera with respect to the non-tracking region.

In at least one embodiment, when the player object is moved within the non-tracking region, the position of the virtual camera is prevented from being moved in the movement direction of the player object. When the player object is moved from the non-tracking region to one of the near tracking region and the far tracking region, the position of the virtual camera is moved such that the player object is located in the non-tracking region.

With this configuration, the tracking control of the virtual camera is appropriately performed when the player object is moved to the near tracking region or the far tracking region, but the virtual camera is not subjected to tracking control when the player object is moved within the non-tracking region. Therefore, a VR sickness due to an unexpected motion of the image of the field of view can be suppressed.

(Item 4)

In at least one embodiment, control be performed such that a movement speed of the position of the virtual camera when the player object is moved to the near tracking region is lower than a movement speed of the position of the virtual camera when the player object is moved to the far tracking region.

Backward movement of the virtual camera (movement of the position of the virtual camera based on the player object moved to the near tracking region) tends to cause VR sickness. Therefore, when the movement speed in the backward movement is decreased as compared to the case of forward movement (movement of the position of the virtual camera based on the player object moved to the far tracking region), the VR sickness can be further reduced.

(Item 5)

In at least one embodiment, when the player object is moved within one of the near tracking region and the far tracking region, the position of the virtual camera be moved such that the player object is located in the non-tracking region.

When the player object is moved within the near tracking region or within the far tracking region, by performing tracking control such that the player object is located in the non-tracking region instead of moving the position of the virtual camera directly in synchronization with the movement of the player object, an unexpected motion of the image is suppressed, in at least some instances.

(Item 6)

In at least one embodiment, a relief region be provided between the non-tracking region and the far tracking region. In at least one embodiment, in a case where the player object is moved from the non-tracking region to the far tracking region, the moving of the position of the virtual camera be initiated when the player object is located at a boundary between the far tracking region and the relief region, and the moving of the position of the virtual camera be ended when the player object is located at a boundary between the relief region and the non-tracking region.

When the relief region is provided, tracking control of the virtual camera is prevented from being excessively sensitive, and excess change of the image of the field of view is suppressed, in at least some instances.

(Item 7)

In at least one embodiment, control is performed such that, when the player object is moved outside of the field of view region, the position of the virtual camera is prevented from being moved.

(Item 8)

In at least one embodiment, when the player object is moved outside of the field of view region, and then the player object enters the field of view region again due to the updating of the image of the field of view in synchronization with the movement of the head mounted display, the position of the virtual camera be moved such that the player object is located in the non-tracking region.

With those configurations, the initiative of the operation of tracking the player object by the virtual camera is left to the user, and hence the sense of presence in the game is improved, in at least some instances.

(Item 9)

A system according to at least one embodiment of this disclosure is a system for executing the method of any one of Items 1 to 8.

With this configuration, the program capable of reducing the VR sickness while improving the sense of presence is provided.

Examples of a method of adjusting a field of view region in a virtual space provided to an HMD and a system for executing the method according to at least one embodiment of this disclosure are described below with reference to the drawings. The virtual space is herein a three-dimensional virtual space, but this disclosure is not necessarily limited thereto. This disclosure is not limited to those examples, and is defined by the appended claims. One of ordinary skill in the art would understand that this disclosure includes all modifications within the appended claims and the equivalents thereof. In the following description, like elements are denoted by like reference symbols in the description of the drawings, and redundant description thereof is omitted.

Figure 2:
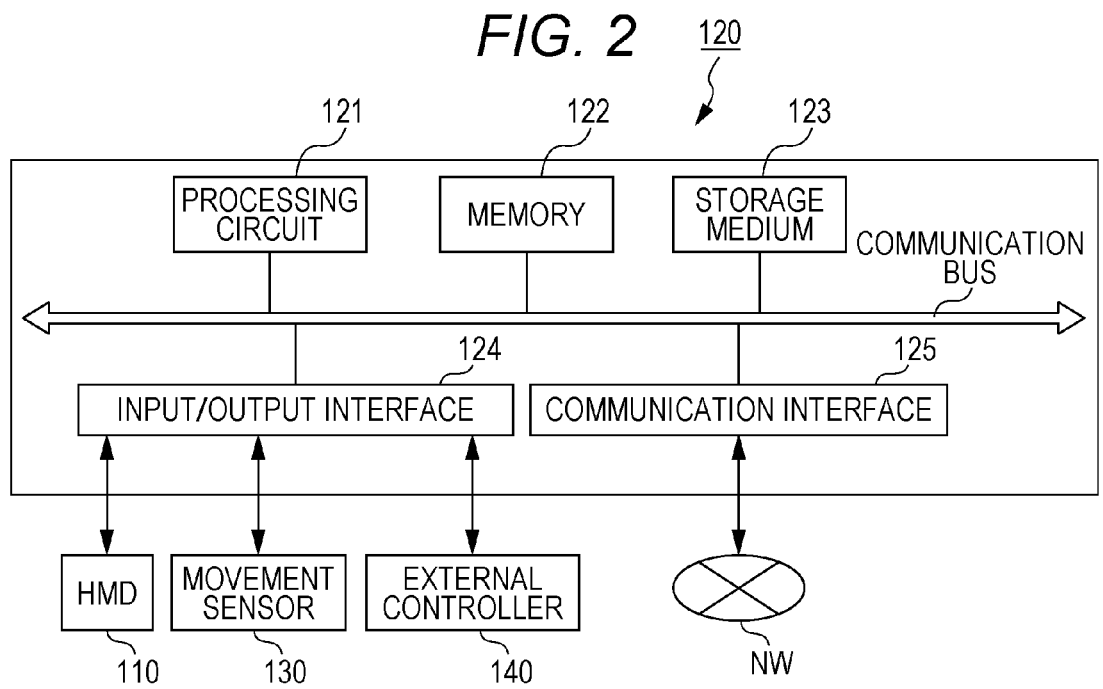
FIG. 2 is a block diagram of a hardware configuration of a control circuit unit included in the HMD system of FIG. 1.

FIG. 1 is a schematic view of a configuration of an HMD system using an HMD according to at least one embodiment. FIG. 2 is a block diagram of a hardware configuration of a control circuit unit included in the HMD system of FIG. 1.

As illustrated in FIG. 1, an HMD system 100 includes an HMD 110 that is wearable on a head of a user U, a control circuit unit 120, a movement sensor 130, and an external controller 140.

The HMD 110 includes a display unit 112, an HMD sensor 114, and headphones 116. In at least one embodiment, the headphones 116 are not included in the HMD 110, and a speaker and headphones that are independent of the HMD 110 may be used.

The display unit 112 includes a non-transmissive (or partially transmissive) display device configured to completely cover a field of view (visual field) of the user U wearing the HMD 110. With this, the user U can see only a screen displayed on the display unit 112. That is, the user U loses (or partially loses) the visual field of the external world, and hence the user U can be immersed in a virtual space displayed on the display unit 112 by an application executed by the control circuit unit 120.

The HMD sensor 114 is mounted near the display unit 112 of the HMD 110. The HMD sensor 114 includes at least one of a geomagnetic sensor, an acceleration sensor, or an inclination (angular velocity or gyro) sensor, and can detect various movements of the HMD 110 worn on the head of the user U.

The movement sensor 130 includes, for example, a position tracking camera (position sensor). The movement sensor 130 is connected to the control circuit unit 120 so as to be capable of communicating to/from the control circuit unit 120, and has a function of detecting information relating to positions or inclinations of a plurality of detection points (not shown) provided on the HMD 110. The detection points are, for example, light emitting portions configured to emit infrared light or visible light. The position tracking camera serving as the movement sensor 130 includes an infrared sensor or a plurality of optical cameras. The control circuit unit 120 is configured to acquire information of the position of the HMD 110 from the movement sensor 130, to thereby accurately associate a position of a virtual camera in the virtual space with the position of the user U wearing the HMD 110 in the real space.

In at least one embodiment, the HMD system includes at least one of the HMD sensor 114 or the movement sensor 130 for detecting the movement of the HMD 110. When the movement of the HMD 110 can be sufficiently detected with use of any one of the sensors, the other sensor may be omitted, in at least one embodiment.

The control circuit unit 120 may be configured as hardware (computers such as a personal computer and a server computer connected via a network) different from the HMD 110. As in FIG. 2, the control circuit unit 120 includes a processing circuit 121, a memory 122, a storage medium 123, an input/output interface 124, and a communication interface 125, which are connected to each other via a communication bus serving as a data transmission path. The control circuit unit 120 may be mounted inside the HMD 110. Further, in at least one embodiment, a part of the functions of the control circuit unit 120 may be mounted on the HMD 110, and the remaining functions may be mounted on hardware different from the HMD 110.

The processing circuit 121 includes various processors such as a central processing unit (CPU), a micro-processing unit (MPU), and a graphics processing unit (GPU), and has a function of controlling the entire control circuit unit 120 and HMD system 100.

The memory 122 includes volatile storage devices such as a read only memory (ROM) and a random access memory (RAM), and is configured to store programs to be used by the processing circuit 121 and control data such as calculation parameters.

The storage medium 123 includes non-volatile storage devices such as a flash memory and a hard disk drive (HDD), and is configured to store user authentication programs, game programs including data relating to various images and objects, and other programs. The storage medium 123 may further construct a database including tables for managing various kinds of data.

The input/output interface 124 includes various connection terminals such as a universal serial bus (USB) terminal, a digital visual interface (DVI) terminal, and a high-definition multimedia interface (HDMI)® terminal, and various processing circuits for wireless connection. The input/output interface 124 is configured to connect the HMD 110, the movement sensor 130, the external controller 140, and the like to each other.

The communication interface 125 includes various wire connection terminals for communicating to/from an external device via a network NW, and various processing circuits for wireless connection. The communication interface 125 is configured to adapt to various communication standards for communication via a local area network (LAN) or the Internet.

The control circuit unit 120 is configured to execute an application stored in the memory 122 or the storage medium 123, to thereby present a virtual space on the display unit 112 of the HMD 110. With this, the HMD 110 can execute an operation for immersing the user U in a three-dimensional virtual space (VR space).

The external controller 140 is a user terminal, and is, for example, a game console. In addition, in at least one embodiment, the external controller 140 is a portable device including a touch display, for example, a smart phone, a personal digital assistant (PDA), a tablet computer, or a notebook personal computer (PC). In at least one embodiment, the external controller 140 includes a central processing unit (CPU), a main storage, an auxiliary storage, a transmitting/receiving unit, a display unit, and an input unit, which are connected to each other via a bus. The user U wearing the HMD 110 performs input, for example, touch operation, to the external controller 140, to thereby give various operation instructions to the virtual space.

Next, with reference to FIG. 3, a method of acquiring information relating to the position and the inclination (direction of visual axis) of the HMD 110 is described. The information relating to the position (including direction and inclination) of the HMD 110, which is based on the movement of the head of the user U wearing the HMD 110, is detectable by the movement sensor 130 and/or the HMD sensor 114 mounted on the HMD 110. As in FIG. 3, a three dimensional coordinate system (XYZ coordinates) is defined about the head of the user U wearing the HMD 110. A perpendicular direction in which the user U stands upright is defined as a Y axis, a direction being orthogonal to the Y axis and connecting between the user U and the center of the display unit 112 is defined as a Z axis, and a direction orthogonal to the Y axis and the Z axis is defined as an X axis. The movement sensor 130 and/or the HMD sensor 114 are/is configured to detect angles about the respective axes (that is, inclination determined by a yaw angle representing rotation about the Y axis, a pitch angle representing rotation about the X axis, and a roll angle representing rotation about the Z axis), and the control circuit unit 120 is configured to determine angle (inclination) information data for controlling the virtual camera that defines the visual field information based on the temporal change of the angles.

Figure 4A:
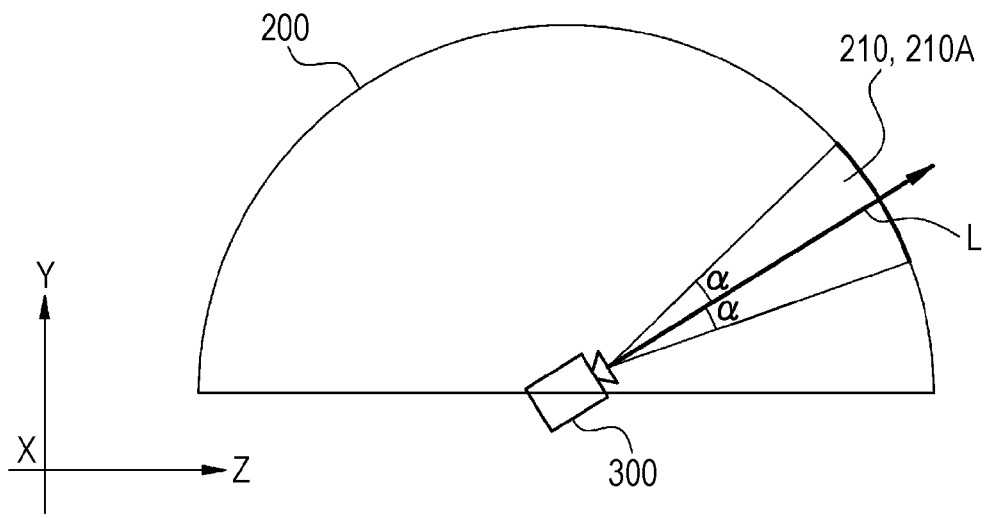
FIG. 4A is a YZ plane diagram of an example of a virtual space and a virtual camera.
Figure 4B:
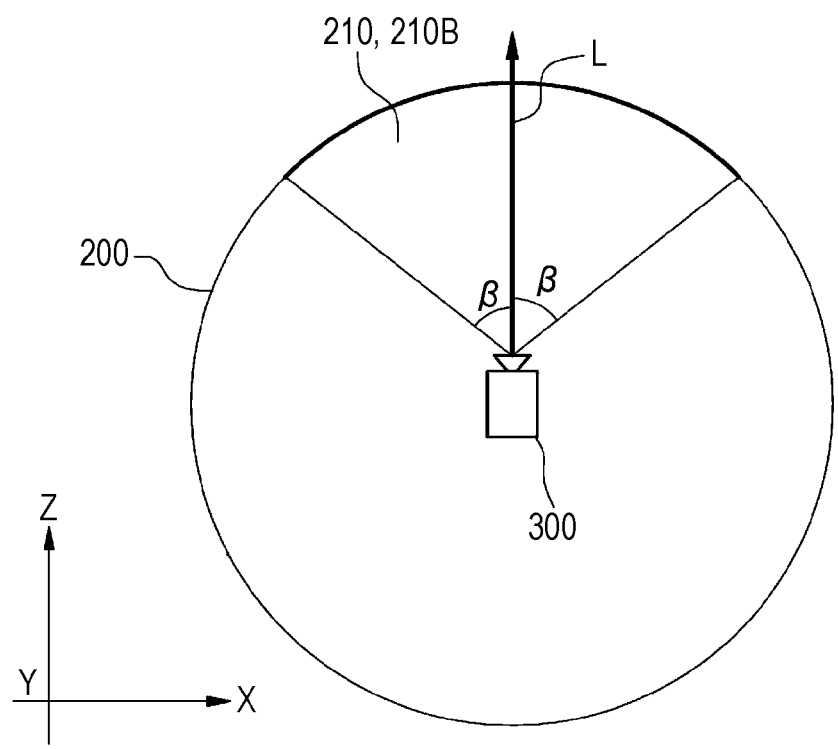
FIG. 4B is an XZ plane diagram of an example of the virtual space and the virtual camera.

FIG. 4A is a YZ plane diagram of an example of a virtual space and a virtual camera, and FIG. 4B is an XZ plane diagram of an example of the virtual space and the virtual camera.

As in FIG. 4A and FIG. 4B, a virtual camera 300 is arranged inside a celestial-sphere virtual space 200. In at least one example, the virtual camera 300 is arranged at the center of the virtual space 200 as viewed from the top. A field of view region (visual region that is visually recognizable by the user) 210 is defined based on the position and the direction of the virtual camera 300 in the virtual space 200. The field of view region 210 is determined based on a reference sight line L of the virtual camera 300. The field of view region 210 has a first region 210A defined as a range including a polar angle α with the reference sight line L being the center in the YZ plane in FIG. 4A, and a second region 210B defined as a range including an azimuth β with the reference sight line L being the center in the XZ plane in FIG. 4B. An image of the field of view that is visually recognizable by the user is generated based on the field of view region 210 including the first region 210A and the second region 210B. The image of the field of view includes two two-dimensional images for right and left eyes. The two-dimensional images for the right and left eyes are superimposed on the display unit 112 of the HMD 110, and thus the image of the field of view is provided to the user as a three-dimensional image.

The movement of the position and the direction of the virtual camera 300 is controllable based on the input from the movement sensor 130 or the HMD sensor 114 and/or the input from the external controller 140. In at least one embodiment, the direction of the virtual camera 300 is changed based on the input from the movement sensor 130 or the HMD sensor 114 (that is, in synchronization with the movement of the head of the user wearing the HMD 110), and the position of the virtual camera is changed based on the input from the external controller 140 (that is, without synchronization with the movement of the HMD 110).

Figure 5:
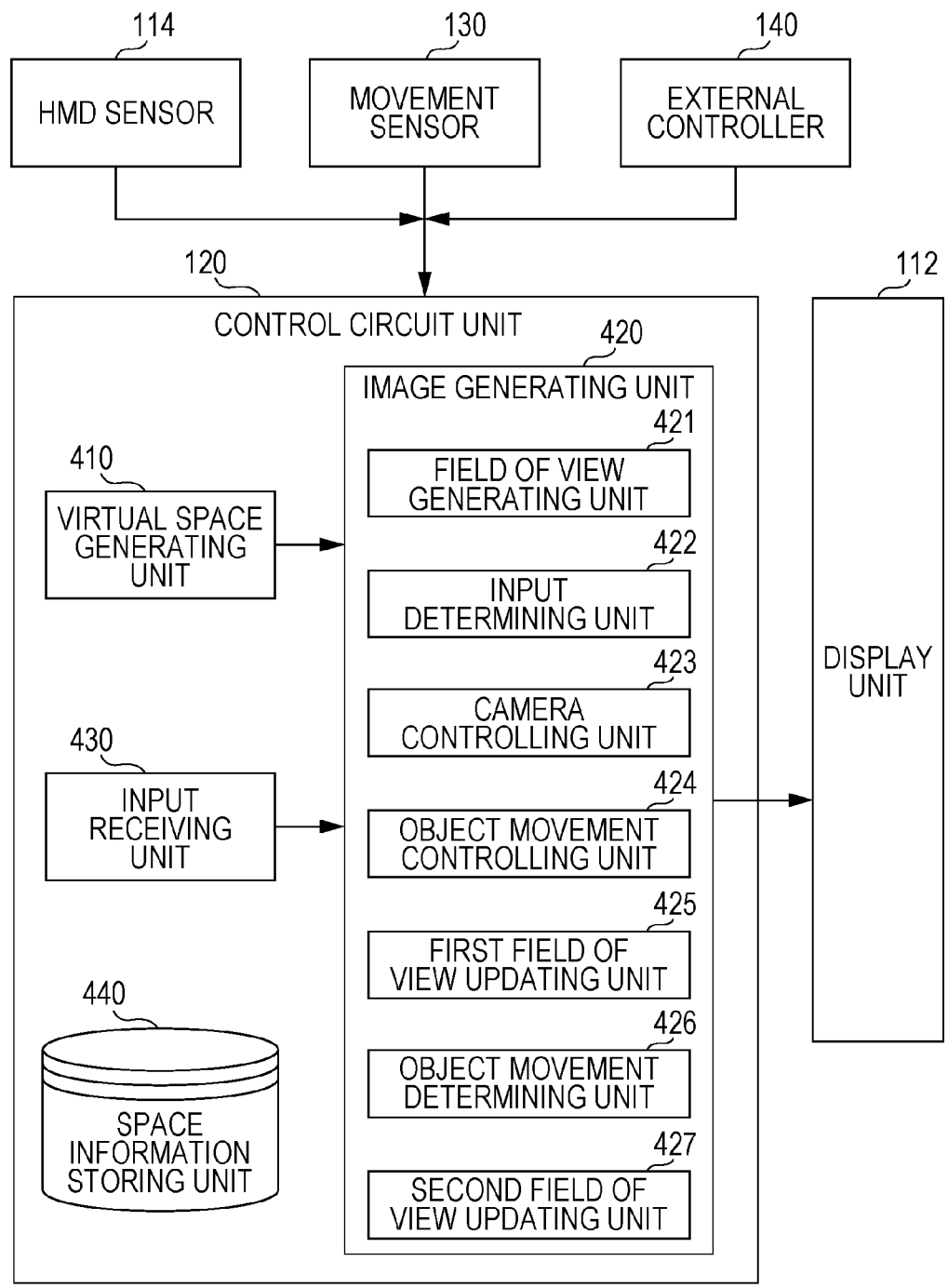
FIG. 5 is a block diagram of a function of the control circuit unit, for achieving the configuration of the embodiment.
Figure 6:
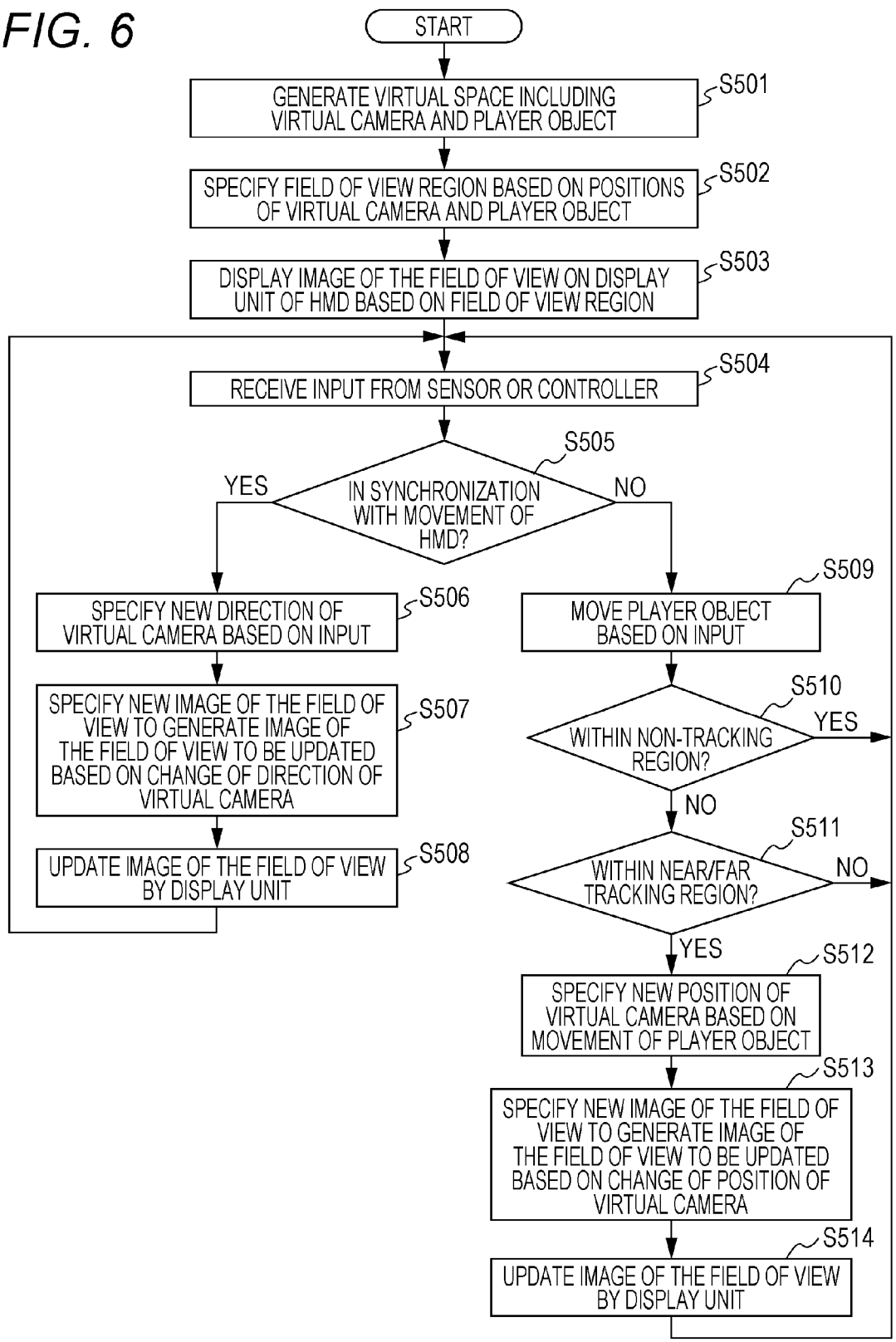
FIG. 6 is a flow chart of a method of processing in the HMD system according to the embodiment.

FIG. 5 is a block diagram of a function of the control circuit unit 120, for achieving the configuration of this embodiment. FIG. 6 is a flow chart of a method of processing in the HMD system according to at least one embodiment.

As illustrated in FIG. 5, the control circuit unit 120 includes a virtual space generating unit 410, an image generating unit 420, an input receiving unit 430, and a space information storing unit 440. The image generating unit 420 includes a field of view generating unit 421, an input determining unit 422, a camera controlling unit 423, an object movement controlling unit 424, a first field of view updating unit 425, an object movement determining unit 426, and a second field of view updating unit 427.

Figure 7A:
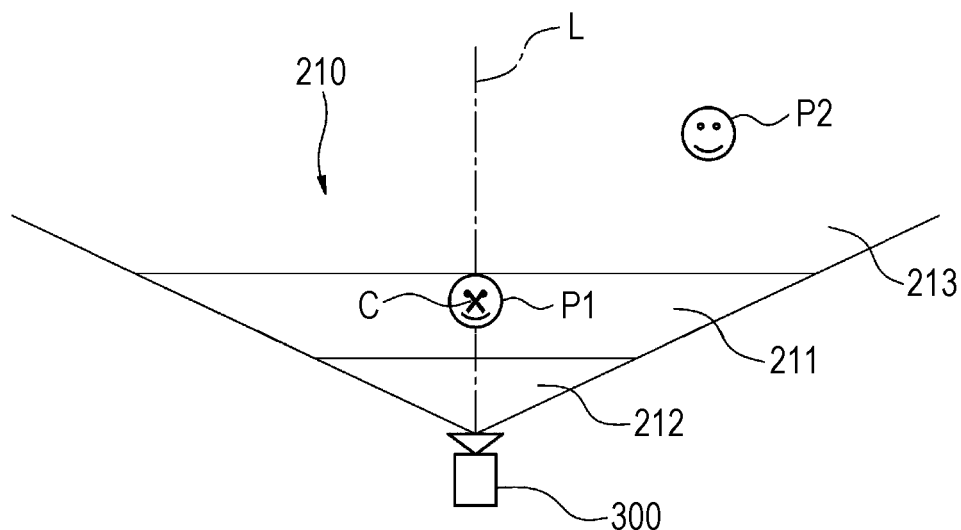
FIG. 7A and FIG. 7B are plan views of a case where an image of the field of view is updated in synchronization with a movement of the HMD.
Figure 7B:
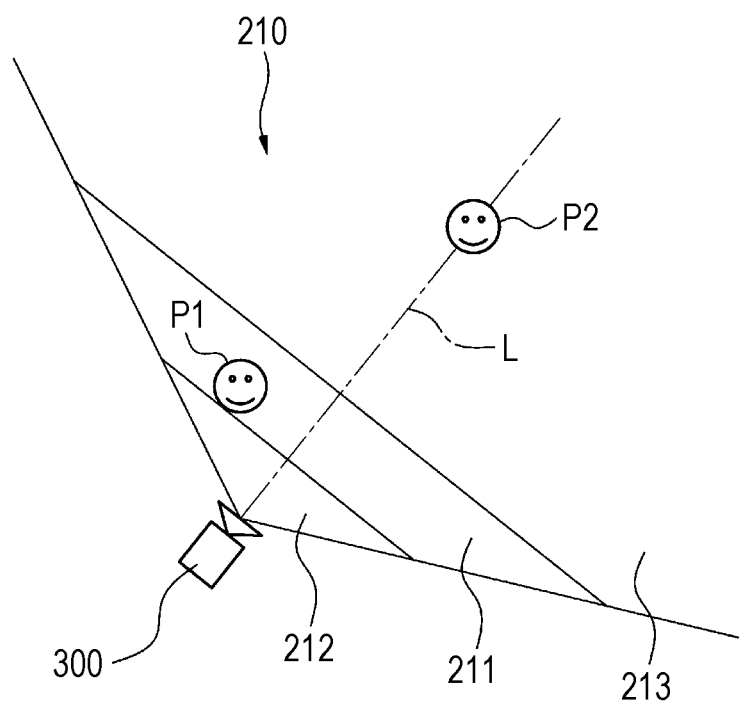

As in FIG. 6, first, the virtual space generating unit 410 refers to the space information storing unit 440 to generate the celestial-sphere virtual space 200 in which the user is immersed (Step S501). As in FIG. 7A and FIG. 7B, in the virtual space 200, there are arranged, together with the virtual camera 300, game objects including a player object P1 that is an own player and a player object P2 that is an opponent player in a match-up sports game, for example, a tennis game. In the example of FIG. 7A, for example, the position of the virtual camera 300 is defined such that the player object P1 is arranged at a predetermined field of view center point C located on the reference sight line L of the virtual camera 300.

Next, in the image generating unit 420, the field of view generating unit 421 specifies the field of view region 210 that is visually recognizable by the user based on the position and the direction of the virtual camera 300 in the virtual space 200 (Step S502). As illustrated in FIG. 7A, the field of view region 210 is sectioned into a band-like non-tracking region 211 extending laterally so as to include the field of view center point C located on the reference sight line L, a near tracking region 212 on the near side of the virtual camera 300 with respect to the non-tracking region 211, and a far tracking region 213 on the far side of the virtual camera 300 with respect to the non-tracking region 211. As in FIG. 7A, for example, when the user wearing the HMD 110 is looking at the player object P1, the position and the direction of the virtual camera 300 are defined such that the player object P1 is located near the field of view center point C in the non-tracking region 211.

Then, the field of view generating unit 421 outputs, as a result of executing Step S502, information relating to the display mode of the field of view based on the field of view region 210 of the virtual camera 300 to the HMD 110. The HMD 110 receives this information to cause the display unit 112 to display the image of the field of view (Step S503).

Next, the input receiving unit 430 receives the input from the HMD sensor 114, the movement sensor 130, and the external controller 140 as input for moving the position and/or the direction of the virtual camera 300 (Step S504). Depending on the content to be executed using the VR space, in some cases, the virtual camera 300 may automatically move in the virtual space 200 to change the field of view region 210 under a state in which there is no movement of the HMD 110 or no input from the external controller 140.

Next, in the image generating unit 420, the input determining unit 422 determines whether the virtual camera 300 is moved in synchronization with the movement of the HMD 110 or without synchronization with the movement of the HMD 110 (Step S505). That is, the input determining unit 422 determines whether the input in Step S504 is input from the HMD sensor 114 and/or the movement sensor 130 or input from the external controller 140.

When it is determined that the input in Step S504 is input for moving the virtual camera 300 in synchronization with the movement of the HMD 110 (that is, input from the HMD sensor 114 and/or the movement sensor 130) ("Yes" from Step S505), in the image generating unit 420, the camera controlling unit 423 specifies a new direction of the virtual camera 300 based on the input from the HMD sensor 114 and/or the movement sensor 130 (Step S506). Then, in the image generating unit 420, the first field of view updating unit 424 specifies a new image of the field of view based on the specified new direction of the virtual camera 300, and generates a image of the field of view to be updated based on the change of the direction of the virtual camera 300 (Step S507). As described above, when the movement of the virtual camera 300 is controlled in synchronization with the movement of the HMD 110, the movement of the HMD 110 in the real space is associated with the movement of the virtual camera 300 in the virtual space 200 such that the reference sight line L of the virtual camera 300 corresponds to the Z-axis direction (see FIG. 3) of the three-dimensional coordinate system of the HMD 110. In at least one example in FIG. 7A, when the user moves his or her head so as to direct his or her sight line toward another game object (for example, the player object P2) from the player object P1, as in FIG. 7B, the direction of the virtual camera 300 is changed such that the player object P2 is located on the reference sight line L in synchronization with the movement of the HMD 110. With this, the field of view region 210 is changed, and the image of the field of view that is visually recognizable by the user is updated. As described above, the image of the field of view may be updated by changing the direction of the virtual camera 300 in synchronization with the movement of the HMD 110. At this time, the position of the virtual camera 300 is defined such that the player object P1 is located in the non-tracking region 211 when the player object P1 is the user's player and is included in the field of view region 210 even after the direction of the virtual camera 300 is changed in synchronization with the movement of the HMD 110. The positional adjustment of the virtual camera 300 when the player object P1 gets out of the field of view region 210 is described later.

Next, the first field of view updating unit 424 outputs, as a result of executing Step S507, information relating to the display mode of the image of the field of view to be updated by changing the direction of the virtual camera 300 to the HMD 110. The HMD 110 receives this information to update the image of the field of view to be displayed on the display unit 112 (Step S508). Then, the processing returns to Step S504.

On the other hand, when, in Step S505, the input in Step S504 is determined to be an input for moving the virtual camera 300 without synchronization with the movement of the HMD 110 (that is, input from the external controller 140) ("No" from Step S505), in the image generating unit 420, the object movement controlling unit 425 moves the player object P1 based on the input from the external controller 140 (Step S509). Specifically, the object movement controlling unit 425 outputs the information relating to the movement of the player object P1 to the HMD 110, and the HMD 110 moves the player object P1 displayed on the display unit 112 based on the received information. In some cases, the player object P1 may automatically move in the virtual space 200 under a state in which there is no input to the external controller 140.

Next, in the image generating unit 420, the object movement determining unit 426 specifies the position of the movement destination of the player object P1 to determine whether or not the position of the movement destination is within the non-tracking region 211 (Step S510). When the movement destination of the player object P1 is determined to be within the non-tracking region 211 ("Yes" from Step S510), the image generating unit 420 does not move the position of the virtual camera 300, and the processing returns to Step S504. As described above, the virtual camera 300 is not subjected to tracking control when the player object P1 is moved within the non-tracking region 211, and hence the risk of VR sickness due to an unexpected motion of the image of the field of view is reduced, in at least some instances.

On the other hand, when the movement destination of the player object P1 is determined to be outside of the non-tracking region 211 (No in Step S510), the object movement determining unit 426 determines whether or not the movement destination of the player object P1 is within the near tracking region 212 or the far tracking region 213 (Step S511).

When the movement destination of the player object P1 is determined to be within the near tracking region 212 or the far tracking region 213 ("Yes" from Step S511), the camera controlling unit 423 specifies a new position of the virtual camera 300 based on the position of the movement destination of the player object P1 (Step S512). Then, in the image generating unit 420, the second field of view updating unit 427 specifies a new image of the field of view based on the specified new position of the virtual camera 300, and generates a image of the field of view to be updated based on the change of the position of the virtual camera 300 (Step S513). As described above, when the movement of the virtual camera 300 is controlled without synchronization with the movement of the HMD 110, the position of the virtual camera 300 is moved so as to track the movement of the player object P1.

Figure 8A:
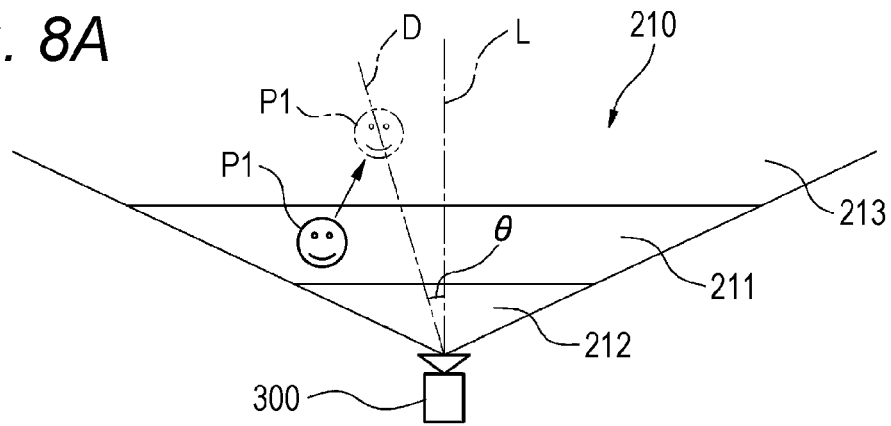
FIG. 8A, FIG. 8B, and FIG. 8C are plan views of a mode of a case where a player object is moved from a non-tracking region to a far tracking region based on input from an external controller.
Figure 8B:
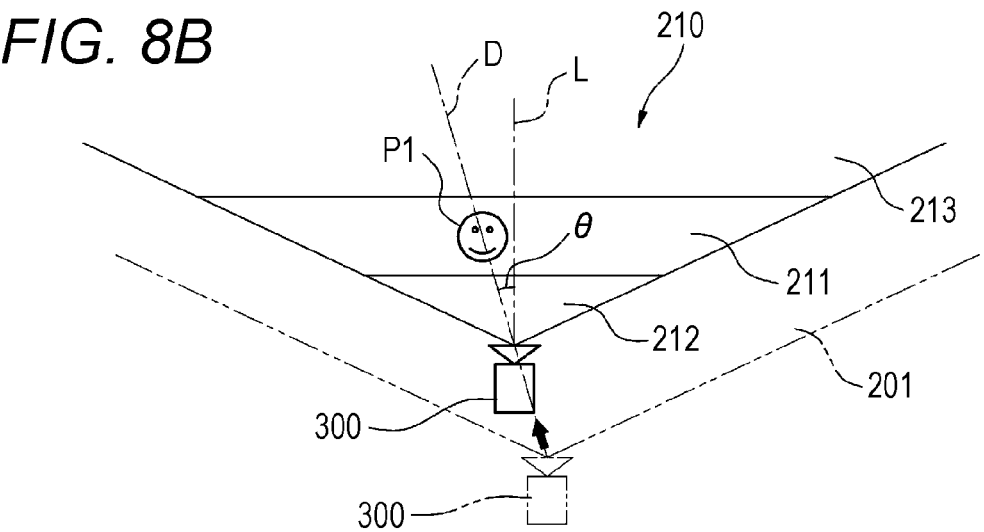
Figure 8C:
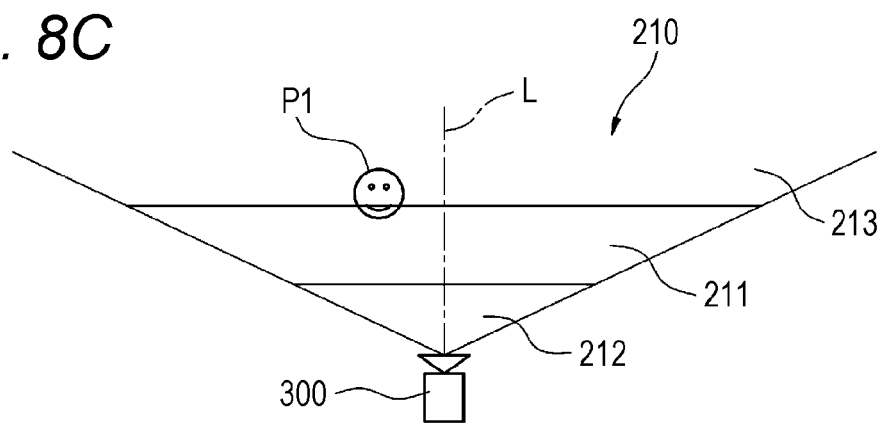
Figure 9A:
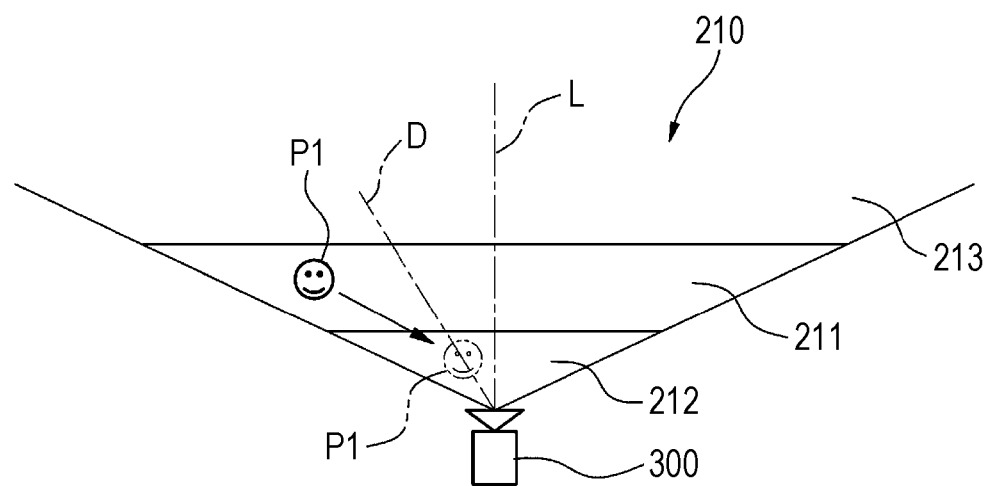
FIG. 9A and FIG. 9B are plan views of a mode of a case where the player object is moved from the non-tracking region to a near tracking region based on input from the external controller.
Figure 9B:
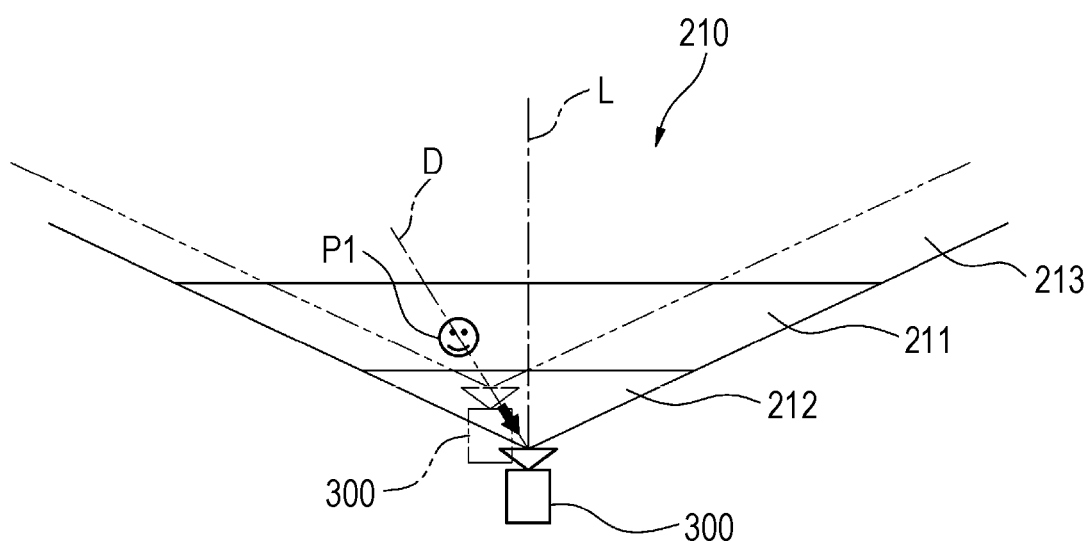

For example, as in FIG. 8A, when the player object P1 is moved from the non-tracking region 211 to the far tracking region 213 based on the input from the external controller 140, the camera controlling unit 423 moves the position of the virtual camera 300 in the movement direction of the player object P1 such that the moved player object P1 is located in the non-tracking region 211. That is, as illustrated in FIG. 8B, the camera controlling unit 423 moves the virtual camera 300 forward until the player object P1 is located in the non-tracking region 211. In detail, the camera controlling unit 423 specifies the movement-destination direction of the player object P1, and moves the virtual camera 300 from the position indicated in FIG. 8A (broken-line position of FIG. 8B) in the movement-destination direction of the player object P1 such that a distance between the movement destination and the position of the virtual camera 300 falls within a predetermined range. The movement destination of the player object P1 is specified based on an angle θ of a movement-destination direction D of the player object P1 with respect to the reference sight line L, and the virtual camera 300 is moved obliquely while maintaining this angle θ such that the player object P1 falls within the non-tracking region 211. That is, when the player object P1 is moved based on the input from the external controller 140, tracking control is performed such that the position of the virtual camera 300 is changed without changing the direction of the virtual camera 300. The movement destination of the player object P1 is specified in each frame (or within a defined number of frames), and the movement direction of the virtual camera 300 is also updated in each frame (or within the defined number of frames). The camera controlling unit 423 may move the position of the virtual camera 300 such that, as in FIG. 8C, at least a part of the player object P1 enters the non-tracking region 211 instead of moving the position of the virtual camera 300 such that the entire player object P1 falls within the non-tracking region 211. Further, as in FIG. 9A, when the player object P1 is moved from the non-tracking region 211 to the near tracking region 212 based on the input from the external controller 140, as in FIG. 9B, the camera controlling unit 423 moves the virtual camera 300 obliquely backward from the current camera position along the movement-destination direction D of the player object P1 until the player object P1 is located in the non-tracking region 211.

When the position of the virtual camera 300 is moved so as to track the movement of the player object P1 as described above, the camera controlling unit 423 moves the position of the virtual camera 300 at a speed lower than the movement speed of the player object P1, in at least one embodiment. The VR sickness may be suppressed when the position of the virtual camera 300 is moved slower than the player object P1. Further, in at least one embodiment, the camera controlling unit 423 performs control such that the movement speed of the position of the virtual camera 300 when the player object P1 is moved to the near tracking region 212 is lower than the movement speed of the position of the virtual camera 300 when the player object P1 is moved to the far tracking region 213. Backward movement of the virtual camera 300 tends to cause VR sickness, and hence, when the movement speed in the backward movement is decreased as compared to the case of forward movement, the VR sickness is further reduced, at least on some instances.

Next, the second field of view updating unit 427 outputs, as a result of executing Step S513, information relating to the display mode of the image of the field of view to be updated to the HMD 110. The HMD 110 causes the display unit 112 to display the updated image of the field of view (Step S514). Then, the processing returns to Step S504.

Figure 10A:
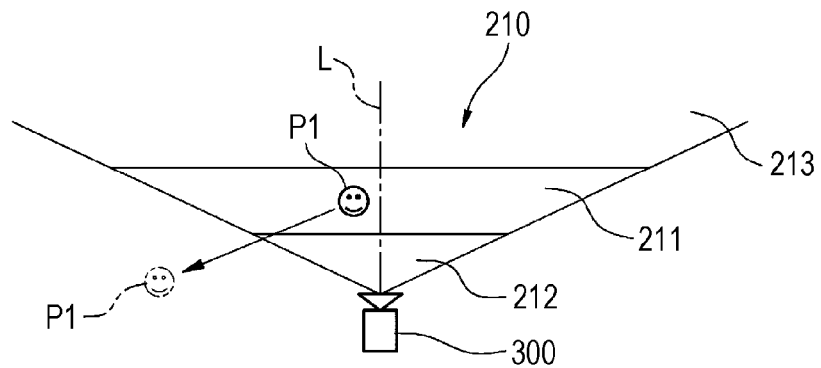
FIG. 10A, FIG. 10B, and FIG. 10C are plan views of a case where a movement destination of the player object is outside of a field of view region.
Figure 10B:
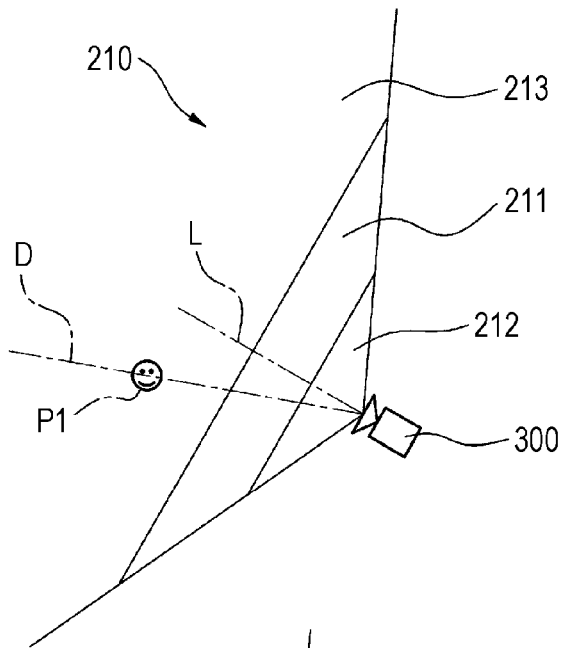
Figure 10C:
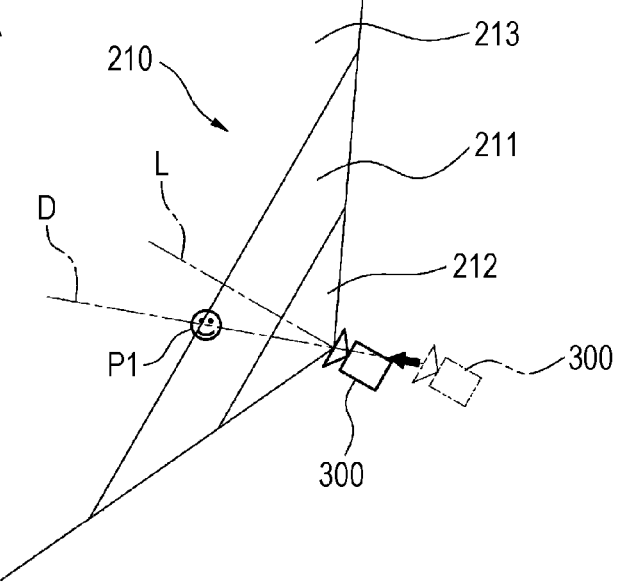

On the other hand, when the movement destination of the player object P1 is determined to be outside of the near tracking region 212 and the far tracking region 213, that is, when the movement destination of the player object P1 is determined to be outside of the field of view region 210 as in FIG. 10A (No in Step S511), the processing returns to Step S504 without performing the movement of the position of the virtual camera 300. As in FIG. 10B, when the user shifts his or her sight line to the player object P1 after the player object P1 is moved outside of the field of view region 210, the image of the field of view is updated in synchronization with the movement of the HMD 110. When the player object P1 enters the field of view region 210 again with this update of the image of the field of view, as in FIG. 10C, the position of the virtual camera 300 is controlled such that the player object P1 is located in the non-tracking region 211. When tracking by the virtual camera 300 is performed without synchronization with the movement of the HMD 110 even when the movement destination of the player object P1 is outside of the field of view region 210, the sense of presence may be reduced. Therefore, in at least one embodiment, the initiative of the operation of tracking the player object P1 by the virtual camera 300 is left to the user.

As described above, in at least one embodiment, the method includes a step of updating the image of the field of view by changing the direction of the virtual camera 300 in synchronization with the movement of the HMD 110, and a step of, when the image of the field of view is updated by changing the position of the virtual camera 300 without synchronization with the movement of the HMD 110, moving the position of the virtual camera 300 in the movement direction of the player object P1 such that the player object P1 moved in the field of view region 210 based on a user action is located in the non-tracking region 211. With this configuration, the image of the field of view is updated by changing the position of the virtual camera 300 in accordance with the movement of the player object P1, and hence the user's sense of presence is improved, at least in some instances. Further, the direction of the virtual camera 300 is changed in synchronization with the movement of the HMD 110, and this change of the direction is predictable to the user. Therefore, a VR sickness of the user is reduced, at least in some instances.

Figure 11A:
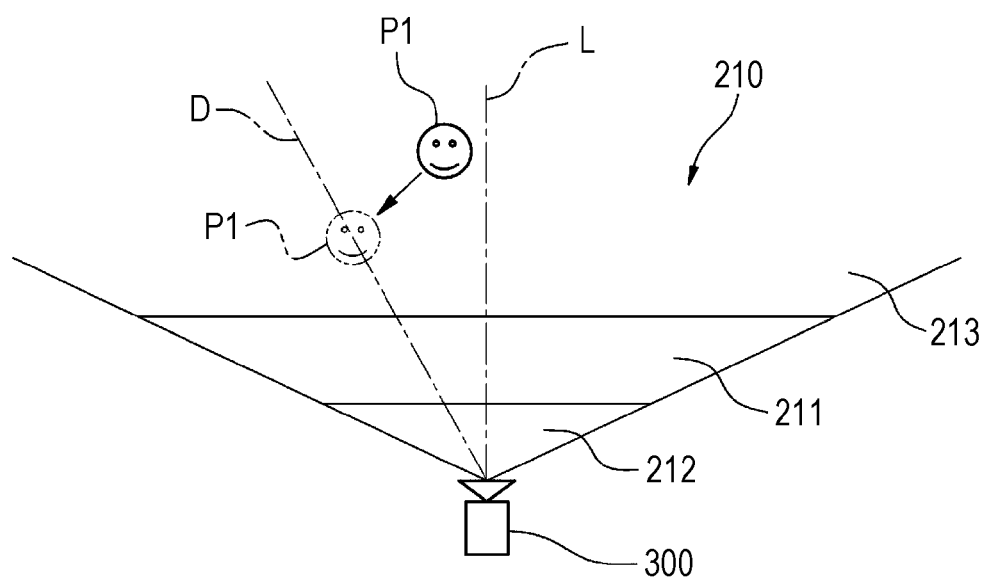
FIG. 11A and FIG. 11B are views of a mode of a case where the player object is moved within the far tracking region.
Figure 11B:
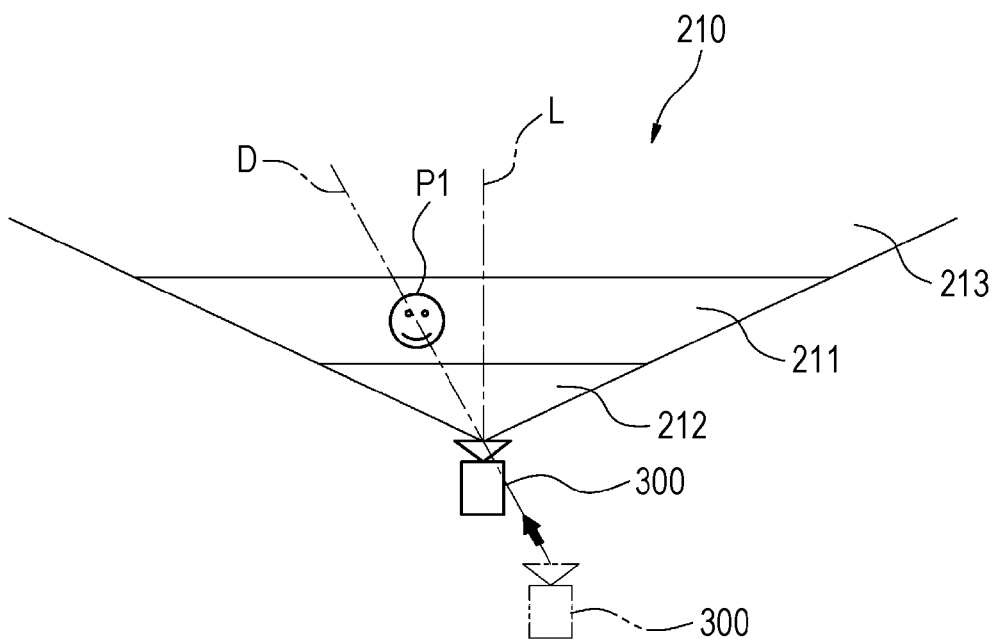

As illustrated in FIG. 11A, when the player object P1 is moved within the far tracking region 213 (or within the near tracking region 212), in at least one embodiment, the position of the virtual camera 300 is moved such that the player object P1 is located in the non-tracking region 211 as in FIG. 11B instead of moving the position of the virtual camera 300 directly in synchronization with the movement of the player object P1. When the player object P1 is moved within the far tracking region 213 or within the near tracking region 212, the position of the virtual camera 300 is controlled such that the player object P1 is basically located in the non-tracking region 211. Thus, an unexpected motion of an image is suppressed.

Figure 12A:
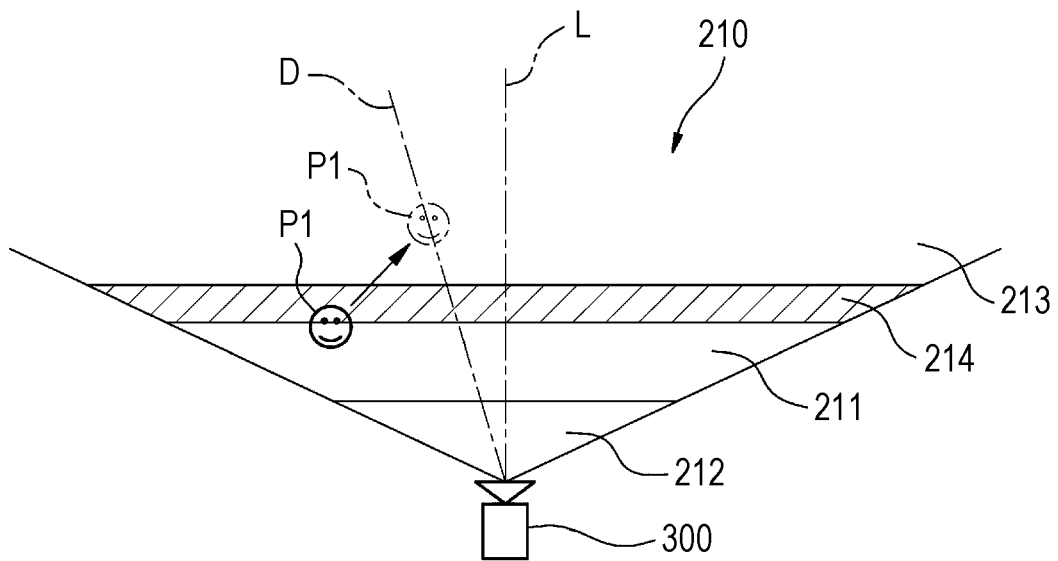
FIG. 12A and FIG. 12B are plan views of a mode of a case where a relief (buffer) region is provided between the non-tracking region and the far tracking region.
Figure 12B:
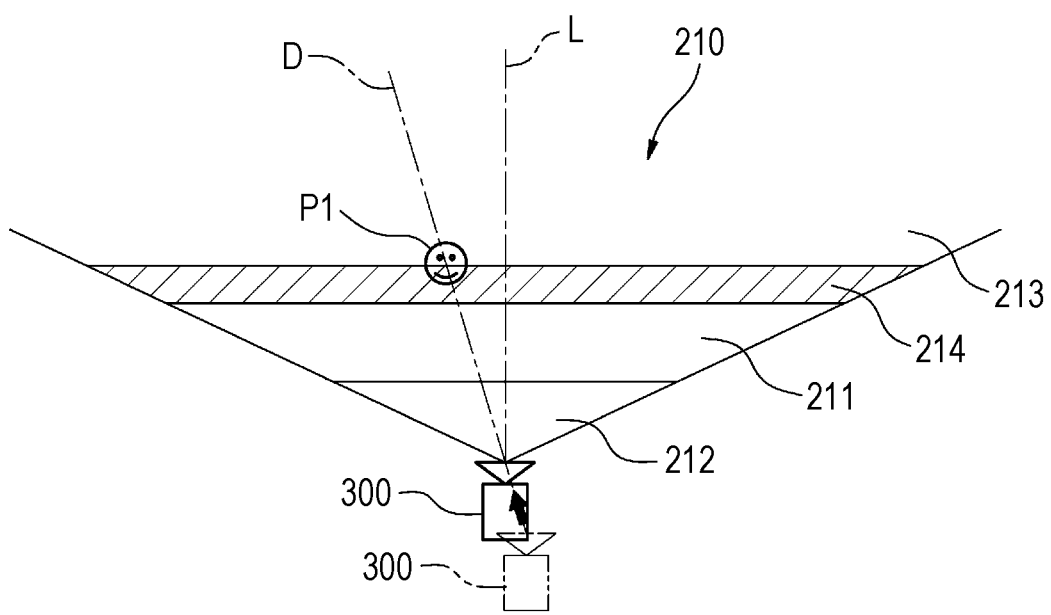

Further, as in FIG. 12A, in the field of view region 210, a relief region (buffer region) 214 may be provided between the non-tracking region 211 and the far tracking region 213. In this case, when the player object P1 is moved from the non-tracking region 211 toward the far tracking region 213, as in FIG. 12A, the position of the virtual camera 300 is prevented from being moved when the player object P1 reaches the boundary between the non-tracking region 211 and the relief region 214, and, as illustrated in FIG. 12B, the movement of the position of the virtual camera 300 is initiated when the player object P1 reaches the boundary between the relief region 214 and the far tracking region 213. Then, when the position of the virtual camera 300 is moved, and thus, as in FIG. 12A, the player object P1 reaches the boundary between the relief region 214 and the non-tracking region 211 again, the movement of the position of the virtual camera 300 stops. As described above, when the relief region 214 is provided so as to delay-control the tracking movement of the virtual camera 300, tracking control of the virtual camera 300 is prevented from being excessively sensitive, and excess change of the image of the field of view is suppressed, at least in some instances.

In the above-mentioned at least one embodiment, the example in which the tracking regions 212 and 213 and the non-tracking region 211 are defined based on the reference sight line L is described, but this disclosure is not limited thereto. For example, in at least one embodiment, the tracking regions 212 and 213 and the non-tracking region 211 may be defined based on the positional relationship between the virtual camera 300 and the player object P1. In this case, the player object P1 may be arranged at a predetermined distance from the virtual camera 300.

The above-mentioned embodiments are merely examples for facilitating an understanding of this disclosure, and does not serve to limit an interpretation of this disclosure. One of ordinary skill in the art would understand that this disclosure can be changed and modified without departing from the gist of this disclosure, and that this disclosure includes equivalents thereof.

What is claimed is:

1. A method comprising:
defining a virtual space;
defining a virtual camera for specifying an image of a field of view of the virtual space, that is visually recognizable by a user;
displaying the image of the field of view on a head mounted display;
moving a player object arranged in the virtual space based on a user action;
updating the image of the field of view by changing a direction of the virtual camera in synchronization with a movement of the head mounted display; and
updating the image of the field of view by changing a position of the virtual camera without synchronization with the movement of the head mounted display by moving the position of the virtual camera such that the player object is located within a predetermined range of a field of view region of the virtual camera,
wherein the field of view region is sectioned into a non-tracking region defined by the predetermined range, a near tracking region on a near side of the virtual camera with respect to the non-tracking region, and a far tracking region on a far side of the virtual camera with respect to the non-tracking region, providing a relief region between the non-tracking region and the far tracking region, and wherein, in response to the player object moving from the non-tracking region to the far tracking region, the position of the virtual camera begins moving in response to the player object being located at a boundary between the far tracking region and the relief region, and the virtual camera stops moving in response to the player object being located at a boundary between the relief region and the non-tracking region.

2. The method according to claim 1, wherein the virtual camera is moved at a speed lower than a movement speed of the player object.

3. The method according to claim 1, wherein, in response to moving the player object within the non-tracking region, the virtual camera is prevented from being moved in the movement direction of the player object, and in response to moving the player object from the non-tracking region to one of the near tracking region or the far tracking region, the virtual camera is moved such that the player object is located in the non-tracking region.

4. The method according to claim 3, further comprising controlling a movement speed of the virtual camera in response to moving the player object to the near tracking region being lower than a movement speed of the virtual camera in response to moving the player object to the far tracking region.

5. The method according to claim 3, wherein, in response to moving the player object within one of the near tracking region or the far tracking region, the virtual camera is moved such that the player object is located in the non-tracking region.

6. The method according to claim 1, further comprising preventing the virtual camera from moving in response to moving the player object outside of the field of view region.

7. The method according to claim 6, wherein, in response to moving the player object outside of the field of view region and then the player object entering the field of view region again due to the updating of the image of the field of view in synchronization with the movement of the head mounted display, the virtual camera is moved such that the player object is located in the non-tracking region.

8. The method according to claim 1, wherein the near tracking region, non-tracking region, relief region, and far tracking region are contiguously arranged in this order in the virtual space with the near tracking region being closest to the virtual camera.

9. The method according to claim 1, wherein the field of view does not include the relief region, and the near tracking region, non-tracking region, and far tracking region are contiguously arranged in this order in the virtual space with the near tracking region being closest to the virtual camera.

10. A system for adjusting a field of view region of a user in a virtual space for a head mounted display, the system comprising:

a non-transitory computer readable medium configured to store instructions; and a processor connected to the non-transitory computer readable medium, wherein the processor is configured to execute the instructions for:

defining a virtual space defining a virtual camera for specifying an image of a field of view of the virtual space that is visually recognizable by a user;

generating instructions for displaying the image of the field of view on a head mounted display;

moving a player object arranged in the virtual space based on a user action;

updating the image of the field of view by changing a direction of the virtual camera in synchronization with a movement of the head mounted display; and updating the image of the field of view by changing a position of the virtual camera without synchronization with the movement of the head mounted display, by moving the position of the virtual camera such that the player object is located within a predetermined range of a field of view region of the virtual camera in response to the player object being located within the field of view, wherein the field of view region is sectioned into a non-tracking region defined by the predetermined range, a near tracking region on a near side of the virtual camera with respect to the non-tracking region, and a far tracking region on a far side of the virtual camera with respect to the non-tracking region, providing a relief region between the non-tracking region and the far tracking region, and wherein, in response to the player object moving from the non-tracking region to the far tracking region, the position of the virtual camera begins moving in response to the player object being located at a boundary between the far tracking region and the relief region, and the position of the virtual camera stops moving in response to the player object being located at a boundary between the relief region and the non-tracking region.

\* \* \* \* \*